Patented Feb. 11, 1936

2,030,264

UNITED STATES PATENT OFFICE 2,030,264

FAST COLORED LACQUER

Hans Nold and Wolfgang Jaeck, Basel, Switzerland, assignors to Society of Chemical Industry in Basle, Basel, Switzerland No Drawing. Application November 17, 1931, Serial No. 575,682. In Switzerland November 25, 1930

5 Claims. (Cl. 134—79)

The present invention relates to the manufacture of colored lacquers. It comprises the process of making these materials, as well as the new compositions of matter.

It has been found that colored lacquers which are fast can be obtained by dyeing or coloring the lacquers with sulfonic acids or the alkali salts thereof of dyestuffs of the general formula

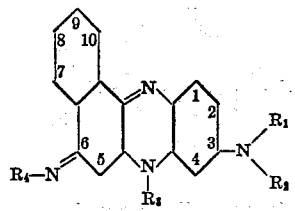

wherein $R_1$=hydrogen, alkyl, or aryl,
$R_2$=hydrogen, alkyl, aryl, or aralkyl,
$R_3$=alkyl or aryl, and
$R_4$=aryl.

In this manner lacquers are obtained which are dyed or colored fast violet to blue tints.

Particularly valuable blue tints are obtained if in the above general formula $R_1$ stands for hydrogen and $R_2$, $R_3$ and $R_4$ for phenyl.

The following examples illustrate the invention, the parts being by weight:—

Example 1

4–5 parts of sodium 3:6-diphenylnaphthophenosafranine-2:7-disulfonate of the formula

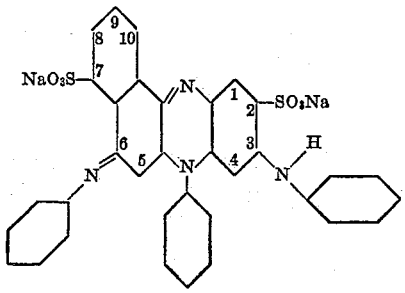

are dissolved in 1000 parts of finished nitro-cellulose varnish. The liquid thus obtained, when applied in thin layers on various supports (metal, glass, leather, wood, celluloid, silk, cotton) leaves on drying a transparent coating whose vivid reddish blue color is very fast.

By incorporating a suitable addition, for example a higher fatty acid, barium sulfate, zinc oxide or titanium dioxide, the transparent varnish can be converted into a matt varnish or covering varnish.

Example 2

1000 parts of a finished nitrocellulose solution, if desired with addition of further solvents, for instance butylacetate, and the usual softening or plasticizing agents, such as tricresylphosphate, castor oil or triphenylphosphate, are mixed with an acetone solution of 4–5 parts of potassium 3-diethyl-6-(3'-sulfo-4'-amino-)-phenylnaphthophenosafranine-1-sulfonate of the formula

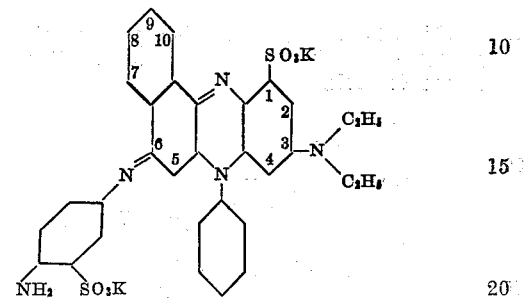

The varnish thus obtained is applicable for producing coatings of vivid blue tint.

Example 3

0.16 part of the sodium salt of 3-ethyl-(4'-sulfo-)-benzyl-6-(3'-carboxy-4'-hydroxy-)phenylnaphthophenosafranine of the formula

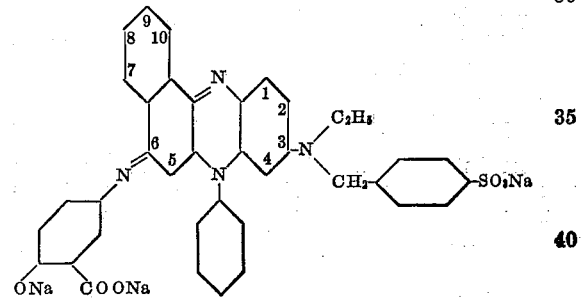

is dissolved in 10 parts of alcohol and the solution is mixed with 30 parts of a powder made from phenol and formaldehyde and moistened with some alcohol. The added alcohol can be evaporated in a vacuum or the mixture may be spread out and left exposed to the air for evaporation of the alcohol. The colored powder, thus dried, is charged into a preheated mold and pressed by a pressure of 150 atmospheres per sq. cm. for 2 minutes at 180° C. The pressed object is colored a fast violet tint.

Example 4

40 parts of a phenol-aldehyde condensation product are intimately mixed with 35 parts of asbestos, 3.4 parts of titanium dioxide and 1 part of sodium 3-(4'-methoxy)-phenyl-6-phenylnaphthophenosafranine-2:7-disulfonate of the formula

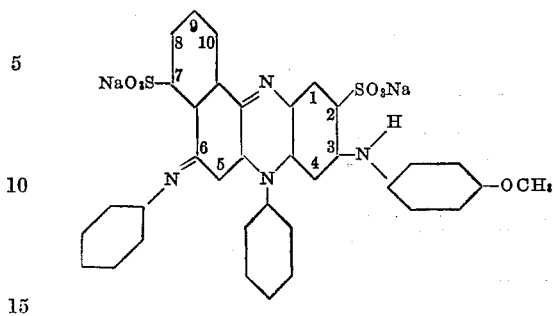

in a rod mill or ball mill, while dry. The powder thus obtained is preliminarily hardened for 2-3 hours at 70-80° C. and pressed at 160-200° C. for 10 minutes under a pressure of about 150 atmospheres per sq. cm.

The object produced is deep blue and resistant to heat.

*Example 5*

0.05 part of sodium 3-(2'-methoxy)-phenyl-6-phenyl - naphthophenosafranine-2:7-disulfonate of the formula

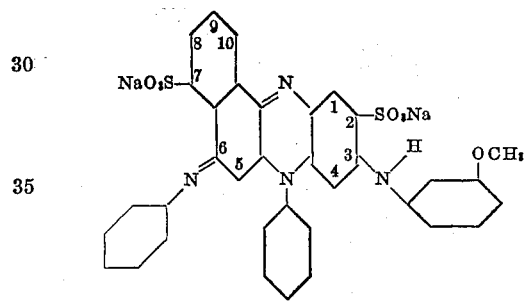

is dissolved in acetone or another organic solvent, for instance monomethylglycol, and the solution is added to a mixture consisting of 20 parts of acetyl-cellulose and 2.5 parts of paratoluene-sulfamide, which mixture has been brought into a plastic condition by heating it in the kneading machine. After further treatment in the kneading machine and cooling, the mass falls to a powder which yields, under a pressure of 100 atmospheres per sq. cm. at about 150° C. pure blue, transparent objects.

In this example also filling agents, such as zinc oxide, barium sulfate, or titanium dioxide may be used, whereby opaque blue objects are obtained.

*Example 6*

0.25 part of sodium 3-diethyl-6-(3'-sulfo-4'-diethylamino) - phenyl-naphthophenosafranine-1-sulfonate of the formula

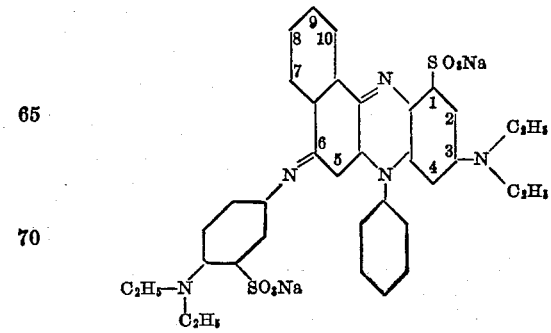

is dissolved in alcohol and the solution is added to 100 parts of a colorless celluloid mass. The paste produced is worked in the kneading machine and then rolled in a calendering machine. The plates obtained are very fast to light. According to their thickness they vary in color from light to dark reddish blue.

In manner analogous to that described in these examples other varnishes and lacquers or plastic masses, such as those made from urea, shellac or copal, may be colored or dyed.

In like manner also dyestuffs may be used which contain a dimethylamino-group in the position 3, or in which a methyl group or ethyl group stands for $R_3$.

What we claim is:—

1. A fast-colored composition of matter consisting of a nitrocellulose lacquer which has been dyed with a sulfonic acid or an alkali salt thereof of a dyestuff of the general formula

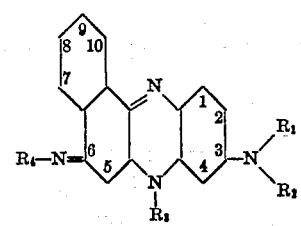

wherein $R_1$=hydrogen, alkyl or aryl,
$R_2$=hydrogen, alkyl, aryl or aralkyl,
$R_3$=alkyl or aryl, and
$R_4$=aryl.

2. A fast-colored composition of matter consisting of a nitrocellulose lacquer which has been dyed with a dyestuff of the formula

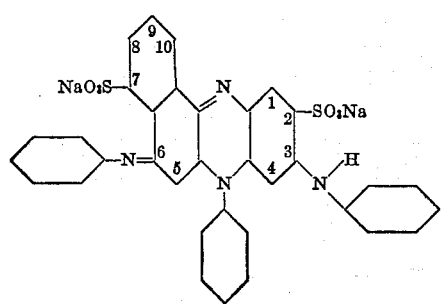

3. A fast-colored composition of matter consisting of a nitrocellulose lacquer which has been dyed with a dyestuff of the formula

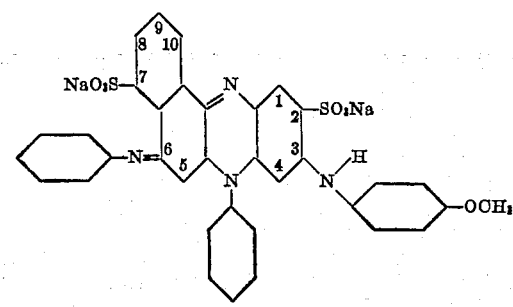

4. A fast-colored composition of matter consisting of nitrocellulose lacquer which has been dyed with a disulfonic acid or an alkali salt thereof of a dyestuff of the general formula

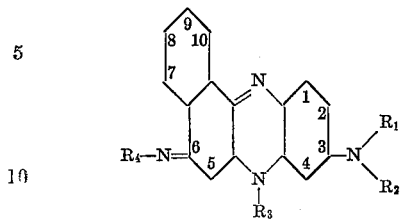

wherein $R_1$=hydrogen, alkyl or aryl,
$R_2$=hydrogen, alkyl, aryl or aralkyl,
$R_3$=alkyl or aryl, and
$R_4$=aryl.

5. A fast-colored composition of matter consisting of a nitrocellulose lacquer which has been dyed with an alkali salt of a dyestuff of the general formula

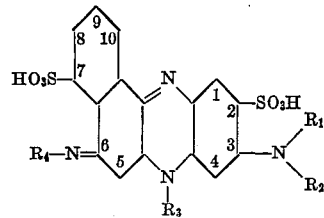

wherein $R_1$=hydrogen, alkyl or aryl,
$R_2$=hydrogen, alkyl, aryl or aralkyl,
$R_3$=alkyl or aryl, and
$R_4$=aryl.

HANS NOLD.
WOLFGANG JAECK.